Nov. 4, 1930.                    W. SMITH                    1,780,279
                            PLANT POT SUPPORT
                            Filed Dec. 9, 1929
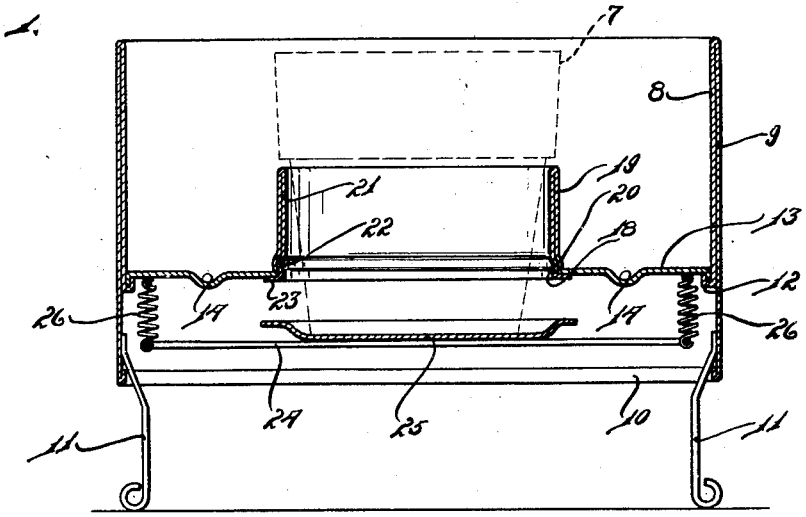
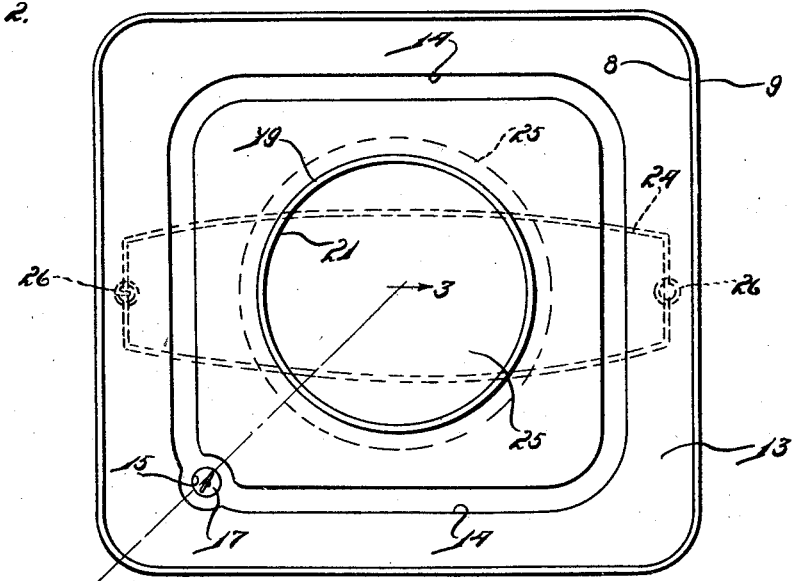
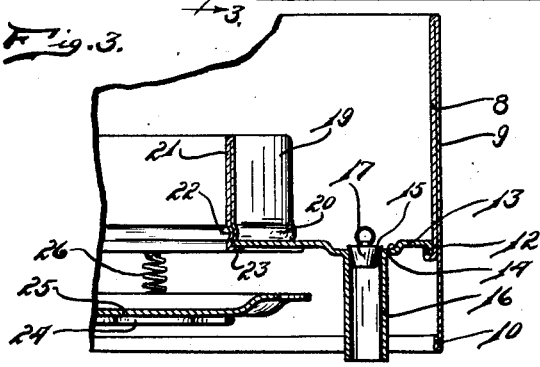
INVENTOR.
William Smith
BY
                                    ATTORNEY.

Patented Nov. 4, 1930

1,780,279

UNITED STATES PATENT OFFICE

WILLIAM SMITH, OF DETROIT, MICHIGAN

PLANT-POT SUPPORT

Application filed December 9, 1929. Serial No. 412,724.

My invention relates to a new and useful improvement in a plant pot support and has for its object the provision of a device of this class whereby a quantity of water may be maintained exposed to the atmosphere in such a position that the vapors arising therefrom will serve to moisten the foliage of the plant in the pot.

Another object of the invention is the provision of a plant pot support of this class which will be simple in structure, economical in manufacture, and highly efficient in use.

Another object of the invention is the provision of a water receptacle engageable with the under surface of the pot for catching water which may drip or leak therefrom.

Another object of the invention is the provison of a drip-pan supported in such a manner as to be maintained in contact with the bottom of the pot.

Other objects will appear hereinafter.

The invention consists in the combination and arrangement of parts hereinafter described and claimed.

The invention will be best understood by a reference to the accompanying drawings which form a part of this specification and in which, Fig. 1 is a central vertical sectional view of the invention.

Fig. 2 is a top plan view of the invention.

Fig. 3 is a fragmentary sectional view taken on line 3—3 of Fig. 2.

The invention is adapted for supporting in position a plant pot 7 in which is positioned a growing plant. The invention comprises a receptacle having side walls each doubled upon itself to provide the inner wall 8 and the outer wall 9, the outer wall 9 being extended below the lower edge in the inner wall 8 and doubled upon itself at its lower edge 10 for reinforcing purposes.

Supporting legs 11 are mounted on the downwardly extended portion of the outer wall for retaining the receptacle in elevated position relative to the surface on which supported. The lower edge of the inner wall 8 is turned upwardly and crimped on the downwardly turned edge 12 of the bottom 13 in which are formed channels 14 leading to the outlet opening 15, depending from which is a drain pipe 16. A plug 17 serves as a closure for this outlet opening. A central opening 18 is formed in the bottom 13 and a cylindrical member is engaged in this opening 18 to serve as a support for the pot 7. This cylindrical member is doubled upon itself to provide the outer wall 19 which is bulged outwardly at 20 and positioned in engagement with the upper surface of the bottom 13. The inner wall 21 is bulged outwardly as at 22 and doubled over at 23 to engage the under surface of the bottom 13. Fixedly mounted on a suitable supporting frame 24 is a saucer like drip-pan 25 retained in alignment with the cylindrical member and normally held by the spring 26 which serves to support the frame 25 in engagement with the bottom of the pot 7. The use of the springs 26 permits the positioning of pots of various lengths on the support, while, at the same time the drip-pan 25 is maintained in contact with the bottom of the pot.

In use, the plant would be watered in the usual manner by pouring water into the pot 7, but it has been found, especially when plants are kept in a warm room, that such a method of watering is not entirely satisfactory owing to rapid evaporation. To prevent the evaporation of the water from the roots, and this evaporation is generally effected through and on account of the foliage, the present invention may be used to produce around the plant, and particularly around the foliage, a humidified atmosphere and maintain the atmosphere around the foliage of the plant in a humid state. To accomplish this, water is also poured into the receptacle so that it lies on the bottom 13 and the quantity of water deposited thereon is determined by the height of the centrally positioned cylindrical member comprising the walls 19 and 21. This water will evaporate and produce the humidifying effect as well as serving to irrigate the plant, and the vapor coming into contact with the foliage of the plant.

When it is desired to clean or drain the receptacle, the plug 17 may be removed and the cleaning and draining easily and quickly effected, the channel 14 being inclined toward the outlet opening 15.

While I have illustrated and described the preferred form of construction I do not wish to limit myself to the precise details of structure shown but desire to avail myself of such variations and modifications as may come within the scope of the appended claims.

Having thus described my invention, what I claim as new and desire to secure by Letters Patent is:

1. A plant pot support of the class described, comprising: a receptacle having an opening formed in its base; an engaging member projecting upwardly from said base around said opening and serving as a support for a pot positioned therein; a drip pan positioned beneath said opening; and yieldable means for maintaining said drip pan in engagement with the bottom of said pot.

2. A plant pot support of the class described, comprising a receptacle having an opening formed in its base; a supporting member projecting upwardly from said base around said opening for supporting a plant pot positioned therein; a supporting frame positioned beneath said base; a drip pan on said supporting frame beneath said opening; and yieldable means connecting said supporting frame to said base and maintaining said drip pan in engagement with the bottom of said pot.

3. A plant pot support of the class described, comprising: a receptacle having an opening formed in its base; a supporting member projecting upwardly from said base around said opening for supporting a plant pot positioned therein; a supporting frame positioned beneath said base; a drip pan on said supporting frame beneath said opening; and yieldable means connecting said supporting frame to said base and maintaining said drip pan in engagement with the bottom of said pot, the upper surface of said base having grooves formed therein communicating with an outlet opening; and a drain pipe projecting downwardly from said opening.

4. A plant pot support of the class described, comprising: a receptacle having an opening formed in its base; a cylindrical member projecting upwardly from said base around said opening for supporting a plant pot positioned therein in such a position that the bottom of said plant pot will be positioned below said base; a supporting frame positioned beneath said base; a drip pan mounted on said supporting frame beneath said opening and engageable with the bottom of said pot; and resilient means connecting said supporting member to said base in spaced relation thereto.

In testimony whereof I have signed the foregoing specification.

WILLIAM SMITH.